May 7, 1963 M. PETRICK ETAL 3,088,895
BOILING SLURRY REACTOR AND METHOD OF CONTROL
Filed March 27, 1961 2 Sheets-Sheet 1
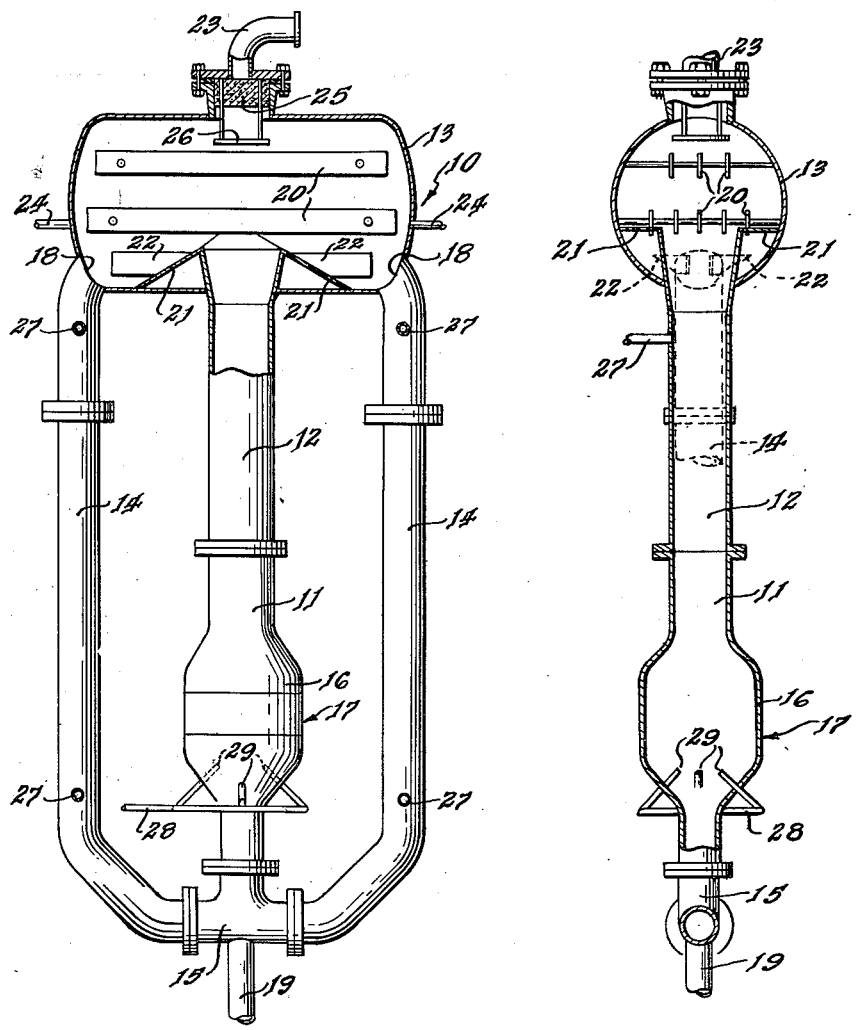
INVENTORS
Michael Petrick
John F. Marchaterre
BY
Attorney

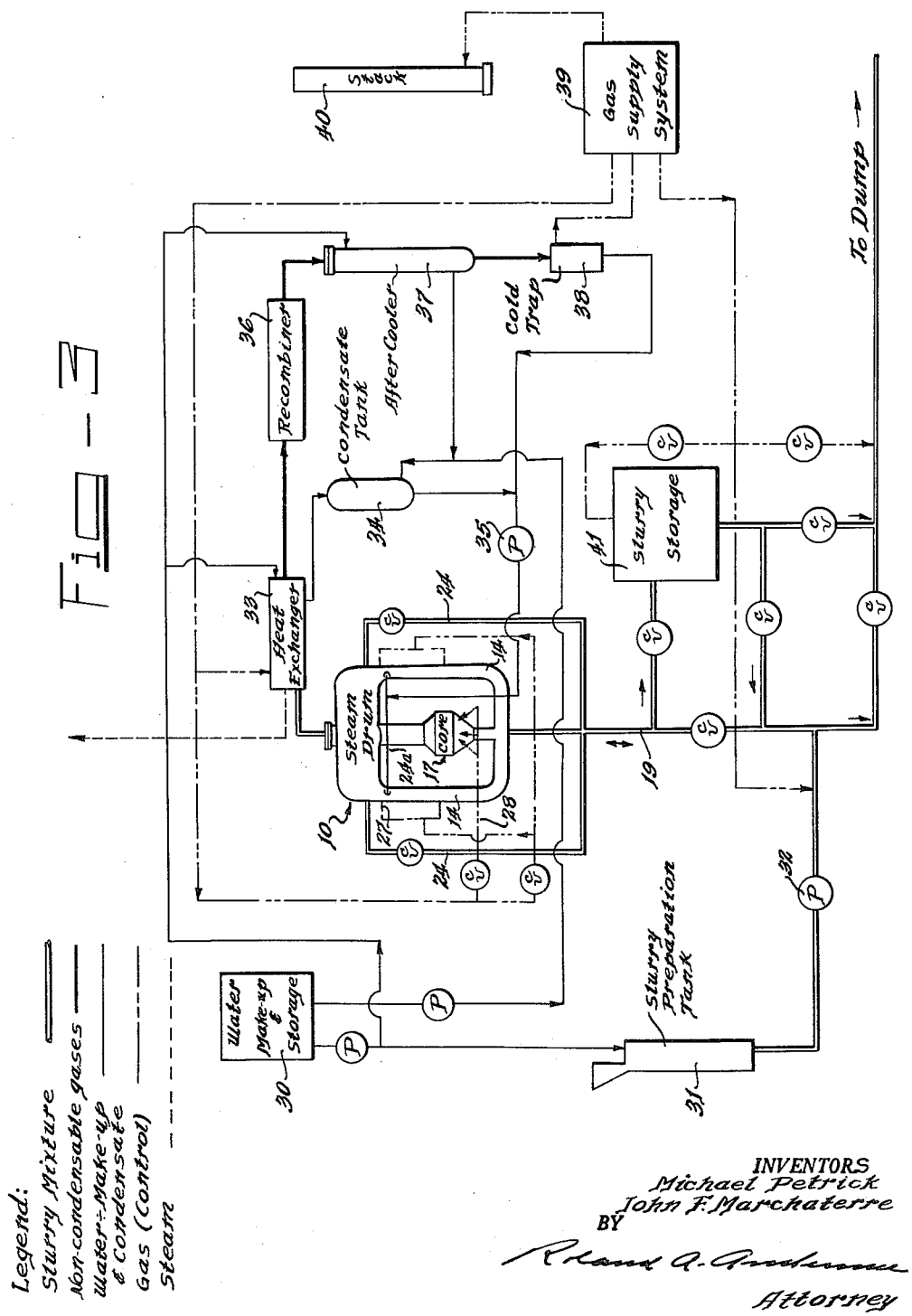

United States Patent Office 3,088,895
Patented May 7, 1963

3,088,895
BOILING SLURRY REACTOR AND METHOD
OF CONTROL
Michael Petrick, Joliet, and John F. Marchaterre, Naperville, Ill., assignors to the United States of America as represented by the United States Atomic Energy Commission
Filed Mar. 27, 1961, Ser. No. 98,722
9 Claims. (Cl. 204—154.2)

This invention relates to a boiling slurry nuclear reactor and to its control. In more detail the invention relates to controlling an aqueous boiling slurry nuclear reactor by controlling the proportion of steam voids within the reactor core.

A boiling slurry reactor consists essentially of a vessel within which a slurry of fine particles of a material fissionable by neutrons of thermal energy—hereinafter simply called a fissionable material—in water is circulated and from which steam is withdrawn directly providing evaporative cooling. Circulation of the slurry by natural convection is maintained by the boiling process; the difference in density between the boiling slurry and the nonboiling slurry results in circulation.

The boiling slurry reactor combines many of the advantages of heterogeneous and homogeneous reactors, retaining much of the simplicity of the former and the promising fuel cycle of the latter. The fuel inventory in a boiling slurry reactor can be kept at a low level since the slurry remains in the reactor vessel and is not circulated through external loops. High recirculation rates, and hence high power density operation, are achieved because the reactor system is hydrodynamically clean, not including a high-resistance core.

The boiling slurry reactor possesses the advantages of the fluid fuel reactor system including high neutron economy, low cost fuel, breeding potential, and continuous fuel processing. Also the reactor possesses excellent heat transfer characteristics since the fuel is dispersed as minute particles which are in intimate contact with the coolant.

Finally, control of the reactor is simple with no necessity for mechanical control rods, since there is a unique set of reactor parameters of pressure, core steam volume fraction, slurry concentration and enrichment which can exist at any time to maintain a just critical system. Reactor control is achieved by varying the core steam volume fraction or adjusting the slurry concentration. This invention relates primarily to control of a boiling slurry reactor by varying the recirculation rate in the reactor to control the proportion of steam voids in the core.

It is accordingly an object of the present invention to develop a method and apparatus for controlling a boiling slurry nuclear reactor.

It is a further object of the present invention to develop a method of controlling the rate of circulation of the slurry through the reactor core to control the reactor.

It is a further object of the present invention to develop a boiling slurry reactor system wherein the radioactive off-gas is maintained in the closed gas system which is used to control the reactor.

These and other objects of the present invention are attained by employing a closed high-pressure gas system to vary the density of fuel slurry at a location in the reactor vessel where it is moving downwardly. By introducing gas into the slurry at this point the density of the slurry is lowered thereby reducing the rate of recirculation of the slurry, so that a higher proportion of steam voids will occur in the reactor core thereby reducing the reactivity of the reactor. Similarly reducing the amount of gas introduced into the slurry at this point will increase the reactivity of the reactor. In addition further control may be had by introducing gas directly into the reactor core. Also in accordance with this invention the problem of direct disposal of radio-active noncondensable gases is circumvented by recycling them through the high-pressure gas system.

Additional objects of the present invention will become apparent from a further reading of this disclosure, particularly when viewed in the light of the drawings, wherein:

FIGURE 1 is a view taken partly in cross-section through a boiling slurry reactor incorporating our invention;

FIGURE 2 is a cross-sectional view taken at right angles to FIGURE 1; and

FIGURE 3 is a flow diagram of the nuclear reactor system showing the feed and control systems.

Referring now to the drawing, FIGURES 1 and 2 show reactor vessel 10 which consists of a vertical tube 11, a riser tube 12 connected to the top thereof, a horizontal steam drum 13 connected to the riser tube 12, and two downcomer pipes 14 in communication with the steam drum 13 and connected to the lower end of vertical tube 11 by a T-connection 15. Vertical tube 11 has an enlarged section 16 which serves as the core 17 of the reactor when filled with fuel slurry. The reactor vessel 10 is filled with a slurry of fine particles of a fissionable material in water to a point above the top of riser tube 12.

As shown, riser tube 12 penetrates the bottom of drum 13 at the center thereof and downcomer pipes 14 are connected to steam drum 13 at slurry outlets 18 near the bottom of the ends thereof. A slurry dump line 19 is also connected into T-connection 15. Steam drum 13 contains a plurality of plates 20, extending longitudinally of the drum, which are arranged as shown in FIG. 2. Plates 20 are formed of 4% boron steel and prevent a chain reaction from occurring in drum 13. A baffle 21 slopes downwardly from the top of riser tube 12 on each side thereof to slurry outlets 18. And a pair of angularly disposed, generally triangular, horizontal plates 22 are disposed on either side of riser tube 12 between the riser tube and slurry outlets 18. Plates 22 are also formed of boron steel and in addition to helping to prevent a chain reaction from occurring serve to direct slurry from riser tube 12 to slurry outlets 18.

Steam drum 13 is also provided with a steam outlet line 23 and with slurry make-up lines 24 and water make-up line 24a. Steam outlet line 23 contains a conventional demister or entrainment separator 25 while a baffle 26 extends across the inlet to the steam outlet line 23.

One of the more important aspects of the present invention resides in the use of a gas under pressure for control of the reactor. This gas may be introduced into downcomer tubes 14 through gas inlet lines 27 at the top and bottom thereof as well as directly into the reactor core 17 through line 28 which is provided with a plurality of nozzles 29.

The manner in which the reactor is controlled will become apparent from referring to FIG. 3. As shown in that figure, water from a make-up and storage system 30 is mixed with uranium dioxide powder in slurry preparation tank 31. The fuel slurry thus prepared may then be pumped to reactor vessel 10 by pump 32. When a critical concentration of slurry is reached in core 17 the water boils and the slurry circulates upwardly through the core and downwardly through downcomers 14. Steam is taken off from steam drum 13 and passed through heat exchanger 33 countercurrent to water obtained from water make-up and storage system 30. This water is boiled and the steam is available for performing useful work. The condensate from heat exchanger 33 is retained in condensate tank 34 and returned to reactor vessel 10 by pump 35 through water make-up lines 24a as needed. The noncondensable gases, including radioactive fission products, together with a diluent from a source to be described hereinafter, are passed through a recombiner 36 to reform water or heavy water from the hydrogen or deuterium and oxygen present. The mixture from recombiner 36 is passed through aftercooler 37 in heat exchange relationship to a flow of water from water system 30 and then into cold trap 38. Cold trap 38 is operated at a temperature just above freezing to condense the last traces of moisture from the gas. The water obtained therefrom is returned to reactor vessel 10 and the gas is passed into a gas supply system 39. Gas supply system 39 consists of a compressor and a plurality of storage tanks in one of which the gas may be held when the reactor is shut down until its activity decreases to the point where it is safe to bleed the gas through stack 40 to the atmosphere.

Pressurized gas from gas supply system 39 is used as diluent for the noncondensable gases issuing from heat exchanger 33 to prevent an explosive mixture from being formed. The gas is also introduced into the top and bottom of downcomers 14 through gas inlet lines 27 and serves as the primary control means of the reactor in a manner to be explained hereinafter. It also may be introduced directly into core 17 through inlet line 28 for secondary control.

In addition to its control function the gas is used for pumping of slurry by pressurization and for line flushing as illustrated schematically in the drawing.

Slurry may be removed from the reactor by slurry dump line 19 and either removed from the system entirely or held in a noncritical storage system 41.

Operation and control of the reactor will next be explained. To start up the reactor, slurry of the proper concentration is pumped into core 17 from slurry preparation tank 31 and the reactor vessel is filled to a point over slurry outlets 18. In core 17 the slurry goes critical and starts to boil. The steam in core 17 and riser tube 12 causes the slurry therein to have a lower density than the slurry in downcomers 14. Therefore, natural convective circulation occurs. The reactivity of the reactor can be controlled very quickly by adjusting the recirculation velocity since the reactor power will adjust to maintain the same amount of reactivity tied up in voids. A sudden increase in the recirculation velocity would produce a supercritical condition, since the core mean steam volume fraction would be lowered. The reactor power would therefore increase to again establish a just critical system. A sudden drop in recirculation flow rate would automatically drop the reactor power level, since a subcritical system would tend to exist.

The recirculation velocity is varied by adjusting the "net driving head" of the natural circulation system. This is accomplished by injecting gas into the downcomers 14 to increase the proportion of voids in the slurry to decrease the difference in density between the slurry in the core and in the downcomers. By this means circulation can be very nearly brought to a stop. As circulation is decreased, reactivity is decreased. With a decrease in circulation, residence time of the slurry in the core is raised and the proportion of steam voids in the core is increased. The gas injection is made at points near the top and bottom of each downcomer 14 to assure quick production of gas voids in the downcomer regardless of the downcomer velocity.

The gas inlet line 28 is used at startup to inject the proper percentage of voids into the slurry into the core and to maintain the particles dispersed in the slurry. It may also be used to provide gas during noncritical conditions for injection in the reactor system to create natural circulation and for shutting down the reactor by injecting such a large proportion of voids into the slurry in the core that fissionable material is not present in the core in a critical mass.

Variation of reactor power by adjusting slurry concentration is a more gradual type of secondary control. For example, some of the excess water can be boiled off in the reactor or the slurry in the reactor can be allowed to settle and the excess water decanted from the upper portion of the reactor. Also other means of concentrating the slurry such as Hydroclones can be used. And the slurry concentration may be lowered by a process of dilution.

The ultimate scram of the reactor is dumping the slurry from the reactor vessel 10 into noncritical storage vessels in slurry storage system 41. Although it is contemplated that the reactor can be safely operated without control rods, obviously a conventional safety rod can be employed as an additional safety feature.

A specific reactor according to the present invention will next be described. The reactor is designed for operation at a maximum power level of 5 M.W. under a helium pressure of 150 p.s.i. The reactor vessel consists of a 2-foot by 2-foot cylindrical core with 8-inch and 12-inch pipes at either end, a 1-foot diameter riser, a 3-foot diameter steam drum, and 8-inch diameter downcomer pipes. The initial loading of fuel slurry is a mixture of 40 grams of $UO_3$ and 520 grams of $ThO_2$ per liter of water with the uranium being 93% enriched. An alternative fuel is $UO_3 \cdot H_2O$ in an enrichment of about 5% with a concentration of between 400 and 600 grams per liter. The particles are of the order of a few microns in size.

According to an alternate construction, not shown in the drawing, vertical tube 11 may be of uniform diameter and extend all the way to steam drum 13. In this case that portion of vertical tube 11 between core 17 and steam drum 13 must contain a material having a high neutron-capture cross section to prevent occurrence of a chain reaction therein.

It will be understood that this invention is not to be limited to the details given herein but that it may be modified within the scope of the appended claims.

What is claimed is:

1. A method of controlling a nuclear reactor which includes a core containing a slurry of fissionable material in water and at least one downcomer exterior to the core, the top of the downcomer being in communication with the top of the core and the bottom of the downcomer being in communication with the bottom of the core wherein the reactor is operated under conditions of temperature and pressure such that the water in the reactor core boils thereby causing the slurry to circulate upwardly in the core and downwardly in the downcomer, comprising introducing a gas into the downwardly circulating slurry and varying the amount thereof to change the rate of circulation of the slurry by changing the effective density difference between the upwardly circulating slurry and the downwardly circulating slurry.

2. A method according to claim 1 and including introducing a gas into the boiling slurry to change the proportion of voids therein.

3. A method according to claim 2 wherein the gas used for control includes the radioactive fission products formed in the reactor.

4. A nuclear reactor comprising a vertical tube, a steam drum having a steam outlet and communicating with the top of the vertical tube, at least one downcomer pipe in communication with the steam drum and the bottom of the vertical tube, the vertical tube, downcomers, and a portion of the steam drum being filled with a slurry of fine particles of a fissionable material in water in a concentration such that a critical mass of fissionable material can be present only in a portion of the vertical tube, the reactor being operated under conditions of temperature and pressure such that the slurry boils and circulates through the reactor, and means for changing the driving head which causes the slurry to circulate comprising means for introducing a gas into the downwardly moving portion of the slurry thereby controlling the reactivity of the reactor.

5. The reactor according to claim 4 and including means for introducing a gas into the boiling slurry.

6. A nuclear reactor comprising a reactor vessel including a vertical tube, a steam drum having a steam outlet and communicating with the top of the vertical tube, and two downcomer pipes in communication with the steam drum and the bottom of the vertical tube, the vertical tube including an enlarged section, the reactor vessel containing a slurry of particles of a fissionable material in water in a concentration such that a critical mass can be present in the enlarged section, the reactor being operated under conditions of temperature and pressure such that the water boils, and means for introducing a gas into the top and the bottom of the downcomers to vary the effective density of slurry in the downcomers, thus changing the rate of recirculation of the slurry and thereby the reactivity of the reactor.

7. A boiling slurry reactor comprising a core consisting of an enlarged section of a vertical tube, a horizontal steam drum, a riser tube connected to the top of said vertical tube and penetrating the bottom of said steam drum at the center thereof, two downcomer pipes connected to said drums at the lower edge of the ends thereof, baffles extending across the drum and sloping down from the top of the riser tube to the downcomer pipes, a plurality of boron-steel plates extending longitudinally of the drum, a pair of angularly disposed, generally triangular baffles on each side of the riser tube and extending between the sloping baffle and the downcomer pipe, a steam exit line from the top of the drum containing a demister, a horizontal baffle extending across the inlet to said steam line, an inlet line for make-up water at the top of the downcomers, means for introducing gas into the downcomers to control the rate of flow of slurry therethrough thereby controlling the reaction, a T-tube connecting said downcomers with said vertical tube, and gas inlets located at the bottom of the core for introducing a control gas into the core, and a slurry of a fissionable material in water filling said core, said riser tube and said downcomer tubes, the reactor being operated under conditions of temperature and pressure such that the water boils.

8. A boiling slurry reactor comprising a core, a steam drum above said core communicating therewith, at least one downcomer pipe connecting the steam drum with the bottom of the core, a slurry of a fissionable material in water in the reactor, the reactor being operated under conditions of temperature and pressure such that the water in the core boils, a steam outlet from the steam drum, means for condensing the steam, means for recombining hydrogen and oxygen contained in the steam, a gas storage system for retaining non-condensable gases from the reactor in addition to diluent gases, and means for introducing gas from the gas storage system into the downcomer pipe to control the reactor.

9. A reactor according to claim 8 and including means for introducing gas from the gas storage system into the core.

References Cited in the file of this patent
UNITED STATES PATENTS
2,743,225    Ohlinger et al. _____ Apr. 24, 1956